United States Patent
Centonza et al.

(10) Patent No.: US 8,903,399 B2
(45) Date of Patent: Dec. 2, 2014

(54) METHODS AND NETWORK NODES FOR DETECTING SHORT STAY HANDOVER

(75) Inventors: Angelo Centonza, Winchester (GB); Fredrik Gunnarsson, Linköping (SE); Walter Müller, Upplands Väsby (SE); Oumer Teyeb, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 41 days.

(21) Appl. No.: 13/520,676

(22) PCT Filed: Jun. 7, 2012

(86) PCT No.: PCT/SE2012/050611
§ 371 (c)(1), (2), (4) Date: Jul. 5, 2012

(87) PCT Pub. No.: WO2013/066237
PCT Pub. Date: May 10, 2013

(65) Prior Publication Data
US 2013/0115949 A1    May 9, 2013

Related U.S. Application Data

(60) Provisional application No. 61/555,582, filed on Apr. 11, 2011.

(51) Int. Cl.
*H04W 36/00* (2009.01)
*H04W 4/00* (2009.01)
*H04W 36/24* (2009.01)
*H04W 92/20* (2009.01)
*H04W 88/08* (2009.01)

(52) U.S. Cl.
CPC ............ *H04W 36/245* (2013.01); *H04W 92/20* (2013.01); *H04W 88/08* (2013.01)

USPC .......................................... 455/436; 370/331

(58) Field of Classification Search
CPC ............ H04W 36/24; H04W 36/0083; H04W 36/0094
USPC .......................................... 455/436; 370/331
See application file for complete search history.

(56) References Cited

U.S. PATENT DOCUMENTS

2010/0178922 A1* 7/2010 Han et al. ...................... 455/436
2013/0130688 A1* 5/2013 Chin et al. .................... 455/436
2013/0310046 A1* 11/2013 Wegmann et al. ............ 455/438

FOREIGN PATENT DOCUMENTS

WO    WO 2013020604 A1 *    2/2013

OTHER PUBLICATIONS

Motorola, "Response to R3-092328 and other MRO papers", 3GPP TSG-RAN #65bis, Oct. 12-15, 2009.*

(Continued)

*Primary Examiner* — Opiribo Georgewill
(74) *Attorney, Agent, or Firm* — Murphy Bilak and Homiller PLLC

(57) ABSTRACT

Embodiments herein relate to a method in a second network node (13,14) for detecting a short stay handover of a user equipment (11) in a second cell (16) in a telecommunication system (10). The user equipment (11) is handed over from a first cell (15) to the second cell (16) and from the second cell (16) to a third cell (17) in the telecommunication system (10). The second network node sends, to a first network node (12,18), an indication in a message that a short stay handover has occurred when determined that the user equipment (11) is handed over to the third cell (17) before a time threshold, thereby enabling the first network node (12,18) to detect the short stay handover.

12 Claims, 13 Drawing Sheets

(56) References Cited

OTHER PUBLICATIONS

Huawei, "Implications of MRO performance measurements", 3GPP TSG-RAN WG3 #65bis, Oct. 12-15, 2009.*
European Telecommunications Standards Institute, LTE, Evolved Universal Terrestrial Radio Access Network (E-UTRAN), Self-configuring and self-optimizing network (SON) use cases and solutions, ETSI TR 136 902 V9.3.1 May 2011, pp. 1-23.

Huawei, Rapid Handover, 3GPP TSG-RAN WG3 #65bis, R3-092328, Miyazaki, Japan, Oct. 15, 2009, pp. 1-3.
Huawei, Rapid HO, 3GPP TSG-RAN WG3 #69, R3-102058, Madrid, Spain, Aug. 27, 2010, pp. 1-6.
Huawei, Alcatel Lucent, Rapid HO, 3GPP TSG RAN WG3 #70, R3-103384, Jacksonville, USA, Nov. 19, 2010, pp. 1-8.

* cited by examiner

METHODS AND NETWORK NODES FOR DETECTING SHORT STAY HANDOVER

TECHNICAL FIELD

Embodiments herein relate to a first network node, a second network node, and methods therein for detecting short stay handover in a telecommunication system.

BACKGROUND

In a typical cellular radio system or telecommunication system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some telecommunication systems may also be called, for example, a "NodeB" in UMTS or "eNodeB" (eNB) in LTE. A cell is a geographical area where radio coverage is provided by the radio base station equipment at a base station site. Each cell is identified by an identity within the local radio area, which is broadcast in the cell. Another identity identifying the cell uniquely in the whole telecommunication system is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

A Universal Mobile Telecommunication System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) for user equipments. In a forum known as the Third Generation Partnership Project (3GPP), telecommunication suppliers propose and agree upon standards for third generation networks and UTRAN specifically, and investigate enhanced data rate and radio capacity. Specifications for the Evolved Packet System (EPS) have completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a radio network controller (RNC) are distributed between the radio base stations, e.g., eNodeBs in LTE, and the core network. As such, the RAN of an EPS system has an essentially "flat" architecture comprising radio base stations without reporting to RNCs.

FIG. 1 depicts the architecture of the LTE system. The E-UTRAN is made up of eNBs, which are connected to each other via the X2 interface. Both the S1 and the X2 interface may be divided into control plane (dashed lines) and user plane (solid lines) parts. eNBs are connected to a Mobility Management entity (MME) or a Serving Gateway (S-GW).

Handover is one of the important aspects of any mobile/telecommunication system when a user equipment moves from one cell to another. The telecommunication system tries to assure service continuity of the User Equipment (UE) by transferring the connection from one cell to another depending on several factors such as signal strength, load conditions, service requirements, etc. The provision of efficient handovers, minimum number of unnecessary handovers, minimum number of handover failures, minimum handover delay, etc., would affect not only the Quality of Service (QoS) of the end user equipment but also the overall telecommunication system capacity and performance.

In LTE, UE-assisted, network controlled handover is utilized. The network, such as the radio base station or a core network node, configures the user equipment to send measurement reports and based on these reports the user equipment is moved, if required and possible, to the most appropriate cell that will assure service continuity and quality. Handover is performed via the X2 connection, whenever available, and if not, it is performed via the S1 connection, i.e. involving the Core Network (CN). The X2 Handover process is shown in FIG. 2. The handover procedure may be sub divided into three stages of preparation or initiation, execution and completion. The handover is performed from a source eNB to a target eNB that are under control of a MME and connected to a serving Gateway. The handover procedure comprises different steps such as area restriction provided, Measurement control, UL allocation, Measurement reports transmitted, and a Handover (HO) decision is taken. The source eNB configures the UE measurement procedures according to the area restriction information. UE sends MEASUREMENT REPORT by the rules set by i.e. system information, specification etc. Source eNB makes decision based on MEASUREMENT REPORT and Radio Resource Management (RRM) information to hand off UE and issues a HANDOVER REQUEST message to the target eNB passing necessary information to prepare the HO at the target side. Admission Control may be performed by the target eNB. Target eNB prepares HO with L1/L2 and sends the HANDOVER REQUEST ACKNOWLEDGE to the source eNB. The HANDOVER REQUEST ACKNOWLEDGE message includes a transparent container to be sent to the UE as a Radio Resource Control (RRC) message to perform the handover. The UE receives DL allocation and the RRCConnectionReconfiguration message with necessary parameters and is commanded by the source eNB to perform the HO. The source eNB sends the Sequence Number (SN) STATUS TRANSFER message to the target eNB. After receiving the RRCConnectionReconfiguration message including the mobilityControlInformation, UE performs synchronisation to target eNB and accesses the target cell. The target eNB responds with UL allocation and timing advance. UE sends the RRCConnectionReconfigurationComplete message to confirm the handover to the target eNB to indicate that the handover procedure is completed for the UE. The target eNB can now begin sending data to the UE. The target eNB sends a PATH SWITCH REQUEST message to MME to inform that the UE has changed cell. The MME sends a Modify Bearer request message to the Serving Gateway. The Serving Gateway switches the downlink data path to the target side. The Serving gateway sends one or more "end marker" packets on the old path to the source eNB and then can release resources towards the source eNB. Serving Gateway sends an Modify Bearer Response message to MME. The MME confirms the PATH SWITCH message with the PATH SWITCH ACKNOWLEDGE message. The target eNB informs success of HO to source eNB by sending UE CONTEXT RELEASE and triggers the release of resources by the source eNB. The target eNB sends this message after the PATH SWITCH ACKNOWLEDGE message is received from the MME.

During the preparation or initiation stage, based on the measurement results, a source eNB receives from the user equipment, the source eNB decides whether to handover the connection to another eNB, called a target eNB, or not. If the decision is to handover, the source eNB sends a HANDOVER REQUEST message to the target eNB. The source eNB must indicate the cause of the HO in this message, which may be, e.g.

Handover Desirable for Radio Reasons,
Resource Optimisation Handover, and/or
Reduce Load in Serving Cell Thus the target eNB knows that the HO is due to resource optimization or to reduce the load in the serving cell.

If the target eNB is able to admit the user equipment, a message is sent to the user equipment to initiate the handover, and the handover execution state is entered. DL data arriving at the source eNB for the user equipment are then forwarded to the new target eNB.

The handover completion stage is entered once the target eNB and the user equipment are synchronized and a handover confirm message, see step 11 of FIG. 2, is received by the target eNB. After a proper setup of the connection with the target eNB is performed, which include the switching of the DL path in the serving gateway, the old connection is released and any remaining data in the source eNB that is destined for the user equipment is forwarded to the target eNB. Then normal packet flow may ensue through the target eNB.

The handover is triggered by a UE measurement report configuration. The UE measurement report configuration comprises the reporting criteria, whether it is periodic or event triggered, as well as the measurement information that the user equipment has to report.

The following event-triggered criteria are specified for intra-Radio Access Technology (RAT) measurement reporting in LTE:

Event A1: Serving cell becomes better than absolute threshold, better here meaning signal stronger than a threshold.
Event A2: Serving cell becomes worse than absolute threshold, worse meaning signal is weaker than a threshold.
Event A3: Neighbour cell becomes better than an offset relative to the serving cell.
Event A4: Neighbour cell becomes better than absolute threshold.
Event A5: Serving cell becomes worse than one absolute threshold and neighbour cell becomes better than another absolute threshold.

The most important measurement report triggering event related to handover is A3, and its usage is illustrated in FIG. 3. Signal strength is defined along a vertical axis and time defined along a horizontal axis. The triggering conditions for event A3 may be formulated as:

$$N > S + HOM \qquad \text{(eq. 1)}$$

where N is the signal strength from a neighbouring cell and S is the signal strength of the serving cell, respectively, and HOM is the Handover Margin. HOM is the difference between the radio quality of the serving cell and the radio quality needed before attempting a handover. The radio quality is measured either using Reference Signal Received Power (RSRP) or Reference Signal Received Quality (RSRQ).

The user equipment triggers an intra-frequency handover procedure by sending event A3 report to the eNB. Intra herein meaning that within the same frequencies and inter means between different frequencies. This event A3 occurs when the user equipment measures that the target cell is better than the serving cell with a margin "HOM". The user equipment is configured over Radio Resource Control (RRC) when entering a cell, which RRC belongs to the UMTS WCDMA protocol stack and handles the control plane signalling of Layer 3 between the UEs and the eNBs, and the HOM may be calculated from the following configurable parameters:

$$HOM = Ofs + Ocs + Off - Ofn - Ocn + Hys \qquad \text{(eq. 2)}$$

where:
Ofs is a frequency specific offset of the serving cell
Ocs is a Cell Specific Offset (CIO) of the serving cell
Off is an A3-Offset
Ofn is a frequency specific offset of the neighbor cell
Ocn is the CIO of the neighbor cell
Hys is an hysteresis If the condition in the equation eq. 1 is satisfied and it remains valid or fulfilled for a certain period of time known as Time To Trigger (TTT) e.g. between point A and B, the user equipment sends a measurement report to the serving eNB see FIG. 3. In FIG. 3, event A3 is satisfied at point A and measurement report is sent at point B in time. When it gets the measurement report, the serving eNB initiates a handover towards the neighbour cell.

As discussed above, handover in LTE is controlled via several parameters. Incorrect parameter settings may lead to several problems such as Radio Link Failure (RLF), Handover Failure (HOF) and Ping-pong Handover, also known as Handover Oscillation, which is when the user equipment is handover back and forth within a short period of time.

RLF occurs if the handover parameters are set in such a way that the user equipment doesn't report handover measurements on time, the user equipment might lose the connection with the original cell before handover is initiated. For example, when the user equipment receives a certain number of N310 consecutive "out of sync" indications from lower layer, it assumes a physical layer problem is ensuing, and a timer T310 is started. If the user equipment doesn't receive a certain number of N311 consecutive "in sync" indications from the lower layer before the timer T310 expires, RLF is detected. RLF is also detected when random access problem is indicated from Medium Access Control (MAC) layer or upon indication that the maximum number of RLC retransmissions has been reached.

HOF occurs if the connection with the original cell is lost while HO is on-going with the target cell. When the user equipment receives a Handover (HO) command, i.e. RRC-ConnectionReconfigurationRequest with mobilityControlInfo, as shown in FIG. 2, it starts a timer T304, and if this timer expires before the HO is completed, i.e. RRCConnectionReconfigurationComplete message is sent by the user equipment, a HOF is detected.

Improper handover parameter setting may make the user equipment handover back and forth between two neighbouring cells so called Ping-pong Handover or Handover oscillation. An example of this is a setting that makes the triggering conditions for the handover events A3 valid between the source and neighbour cells at the same time. FIG. 4 illustrates handover oscillation. A user equipment is said to have experienced handover oscillation if it stays in a target cell for a duration T that is less than a handover oscillation threshold Tocs, before it is handed back to the source cell. The oscillation rate may be defined as the ratio between the number of oscillations and the total number of HOs.

There is an upper boundary for an acceptable oscillation rate originating from e.g., core network load. Also the oscillation rate is related to end-user equipment performance.

On one hand oscillation are harmful as this induces additional signalling and delays, and on the other hand, oscillations allow the user equipment to be connected to the 'best' cell with best received signal strength. This needs to be balanced in order for the (end-) user equipment to experience the best performance.

When a RLF or HOF is detected by the user equipment, the user equipment starts a timer T311 and tries to re-establish the connection to the best available cell, e.g. the source cell, another cell belonging to the same source eNB or a neighbour cell belonging to another eNB. This is known as RRC Connection Reestablishment, and is shown in FIG. 5.

The user equipment includes the following information in the RRCConnectionReestablishmentrequest to the E-UTRAN:
   Physical Cell ID (PCI) of the last cell the user equipment was connected to before RLF.
   UE Identity: The Cell Radio Network Temporary Identifier (CRNTI) as well as
   MAC ID for context lookup, using which the last serving cell may identify the user equipment.
   Re-establishment cause: Whether the request is due to handover failure, reconfiguration failure, or other causes.

If the UE context is found in the cell, if it is the source cell or if it was a cell prepared for handover, i.e. handover was on-going when the RLF happened and the cell where the user equipment re-appeared already has the UE context, which was communicated to it from the source cell during Handover Request message exchange, the connection is re-established, sending a RRCConnectionReestablishmentcomplete. Otherwise, if the UE context is not available, or re-establishment didn't succeed before the timer T311 expires, the user equipment has to go to IDLE mode and have to tear down all the active bearers, if any, and may restart the bearer setups, if required.

Configuring all the HO parameters manually in order to avoid the aforementioned problems is too expensive and may be very challenging. As such, Mobility Robustness Optimization (MRO) has been introduced in the 3GPP standard specification to automate the dynamic configuration of handover parameters.

MRO tries to identify the following three situations, and based on the statistical occurrence of these, tries to adjust the HO parameters.
   Too Late HO: A user equipment is handed over late to the target cell, so that the link to the source cell breaks before completing the handover.
   Too Early HO: A user equipment is handed over to a candidate cell too early resulting in a radio link or handover failure in the target cell. The user equipment returns soon to the source cell via re-establishment procedures.
   Handover to wrong cell: A user equipment is handed over to one target cell but it experiences a RLF within a short duration after that in the target cell and the user equipment re-establishes the connection at another cell. A proper parameter setting would have most probably have led to the handing over of the user equipment to the last target cell to begin with.

MRO tries to gather statistics on the occurrence of Too Late HOs, Too Early HOs and HO to the wrong cell, and these statistics are used to adjust the handover parameters. One or more of the following handover parameters controlling the event driven reporting of the user equipment may be adjusted by MRO:
   A threshold indicating how much stronger a certain candidate cell needs to be before it is reported to the serving cell.
   A filter coefficient applied to the measurement before evaluation triggers are considered.
   A time to trigger meaning the time window within which the triggering condition needs to be continuously met in order to trigger the reporting event in the user equipment.

For example, a higher 'too early handover' ratio than desired may be counter-acted by increasing the threshold, delaying the triggering of A3 event. Another example may be the resolving of a higher 'handover to wrong cell' ratio than desired by increasing the threshold towards the first, unwanted, target cell.

Three main messages, namely RLF report, between the user equipment and eNBs, RLF INDICATION, between eNBs, and HANDOVER REPORT, between eNBs, are used by MRO to communicate and/or gather information regarding Too Early Handover, Too Late Handover and Handover to the wrong cell.

The eNB to which the user equipment is reconnecting to, either through a successful RRC re-establishment or via RRCConnectionSetup after IDLE mode, may ask for more detailed information about the failure after the connection is completed. This is done via the UE Information Request procedure, where the eNB may ask for RLF report, as shown in FIG. 6.

The user equipment responds by sending a UEInformationResponse message with a detailed RLF report which may include information such as:
   A measurement result of the last served cell before RLF.
   A measurement result of the neighbour cells performed before RLF.
   A location info, which may include last co-ordinates as well as velocity of the UE when RLF was detected.
   An enhanced CGI (E-CGI), and if that is not available Physical Cell ID (PCI), of the cell where RLF occurred.
   An E-CGI of the cell that the re-establishment attempt was made at.
   Whether the RLF occurred after the reception of a HO command, i.e.
RRCConnectionReconfiguration message including the mobilityControlInfo.
   The E-CGI where this message was received.
   The elapsed time since the reception of this message.
   The RLF type: i.e. whether it is a normal radio link failure or a handover failure.

Using the information disclosed above the eNB may deduce whether the RLF was due to incorrect HO parameters, too early, too late, HO to wrong cell or due to a coverage hole, no cell with sufficient signal strength.

Radio Link Failure Indication

The purpose of the Radio Link Failure Indication procedure is to transfer information regarding RRC re-establishment attempts between eNBs controlling neighbouring cells. The signalling, as shown in FIG. 7, takes place from an eNB1 at which a re-establishment attempt is made to an eNB2 to which the user equipment concerned may have previously been attached prior to radio link failure.

The eNB2 initiates the procedure by sending an RLF INDICATION message to the eNB1 following a re-establishment attempt from a user equipment at the eNB2, when the eNB2 considers that the user equipment may have previously been served by a cell controlled by eNB1.

The RLF INDICATION message sent from eNB2 to eNB1 may comprise the following information elements:

A failure Cell ID: A PCI of the cell in which the user equipment was connected prior to the failure occurred.

A Reestablishment Cell ID: An E-CGI of the cell where RL re-establishment attempt is made.

A UE Identity: A C-RNTI and a MAC ID of the user equipment in the failure cell.

An RLF report: the eNB2 may include the UE RLF Report that it might have received via a UE Information Request, which may be used by the eNB1 to determine the nature of the failure.

An RLF indication is used to communicate Too Late handovers.

Handover Report

If an eNB receives an RLF INDICATION message from a neighbour eNB, and if it finds out that it has sent a UE CONTEXT RELEASE message towards that neighbour eNB within the last Tstore_UE_cntxt seconds, this means that very recently the concerned user equipment was handed over properly to it from the same eNB, the eNB responds by sending a HANDOVER REPORT message that indicates Too Early Handover, as shown in FIG. 8.

If an eNB receives an RLF INDICATION message from a neighbour eNB, and if it finds out that it has sent a UE CONTEXT RELEASE message towards another neighbour eNB within the last Tstore_UE_cntxt seconds, this means that very recently the concerned user equipment was handed over properly to it from another eNB, the eNB responds by sending a HANDOVER REPORT message to the other eNB that indicates Handover to the Wrong Cell.

The HANDOVER REPORT message comprises:

A type of detected handover problem (Too Early Handover, Handover to Wrong Cell).

An E-CGI of source and target cells in the handover.

An E-CGI of the re-establishment cell, in the case of Handover to Wrong Cell.

A Handover cause, signalled by the source during handover preparation.

Network Management

The management system assumed in this disclosure is shown in FIG. 9. The Node Elements (NE), also referred to as eNodeB, are managed by a Domain Manager (DM), also referred to as the operation and Operational Support System (OSS). A DM may further be managed by a Network Manager (NM) via a Ift-N interface. Two NEs are interfaced by X2, whereas the interface between two DMs is referred to as Itf-Point-to-Point (P2P). In this disclosure, it is further assumed that any function that automatically optimizes NE parameters may in principle execute in the NE, DM, or the NMs.

The mobility robustness optimization aims at avoiding handover failures including handover to wrong cell. However, when cells of various coverage areas are deployed, there might be situations where the connections are maintained, but the handover is still suboptimal. One such example is handover oscillations which may be counteracted based on UE history observations. Another example is short stay handovers where a user equipment quickly passes through a cell before being handed over to the next cell.

SUMMARY

An object of embodiments herein is to provide a mechanism in a radio communications network that leads to a more efficient adjustment of handover parameters.

According to an aspect the object is achieved by a method in a second network node for detecting a short stay handover of a user equipment in a second cell in a telecommunication system. The user equipment is handed over from a first cell to the second cell and from the second cell to a third cell in the telecommunication system. The second network node sends, to a first network node, an indication in a message that a short stay handover has occurred when determined that the user equipment is handed over to the third cell before a time threshold. The first network node is thereby enabled to detect the short stay handover.

According to another aspect the object is achieved by a method in a first network node for detecting the short stay handover of the user equipment in the second cell in the telecommunication system. The user equipment is handed over from the first cell to the second cell and from the second cell to the third cell in the telecommunication system. The first network node receives, from the second network node, the indication that the short stay handover has occurred indicating that the user equipment is handed over to the third cell before the time threshold, e.g. 1-5 seconds. The first network node thereby detects the short stay handover.

According to yet another aspect the object is achieved by a second network node for detecting the short stay handover of the user equipment in the second cell in the telecommunication system. The user equipment is handed over from the first cell to the second cell and from the second cell to the third cell in the telecommunication system. The second network node comprises a signalling circuit configured to send, to the first network node, such as the first radio base station or the Operation and Maintenance node (OAM), the indication in a message that a short stay handover has occurred indicating that the user equipment is handed over to the third cell before a time threshold. The signalling circuit is thereby configured to enable the first network node to detect the short stay handover.

According to still another aspect the object is achieved by a first network node for detecting the short stay handover of the user equipment in the second cell in the telecommunication system. The user equipment is handed over from the first cell to the second cell and from the second cell to the third cell in the telecommunication system. The first network node comprises a receiving circuit configured to receive from a second network node an indication that the short stay handover has occurred indicating that the user equipment is handed over to the third cell before a time threshold. The receiving circuit is thereby configured to detect the short stay handover By letting the first network node know whether a short stay handover has occurred the handover parameters may be adjusted in an efficient manner.

BRIEF DESCRIPTION OF THE DRAWINGS

Embodiments will now be described in more detail in relation to the enclosed drawings, in which.

DETAILED DESCRIPTION

Figure 1:
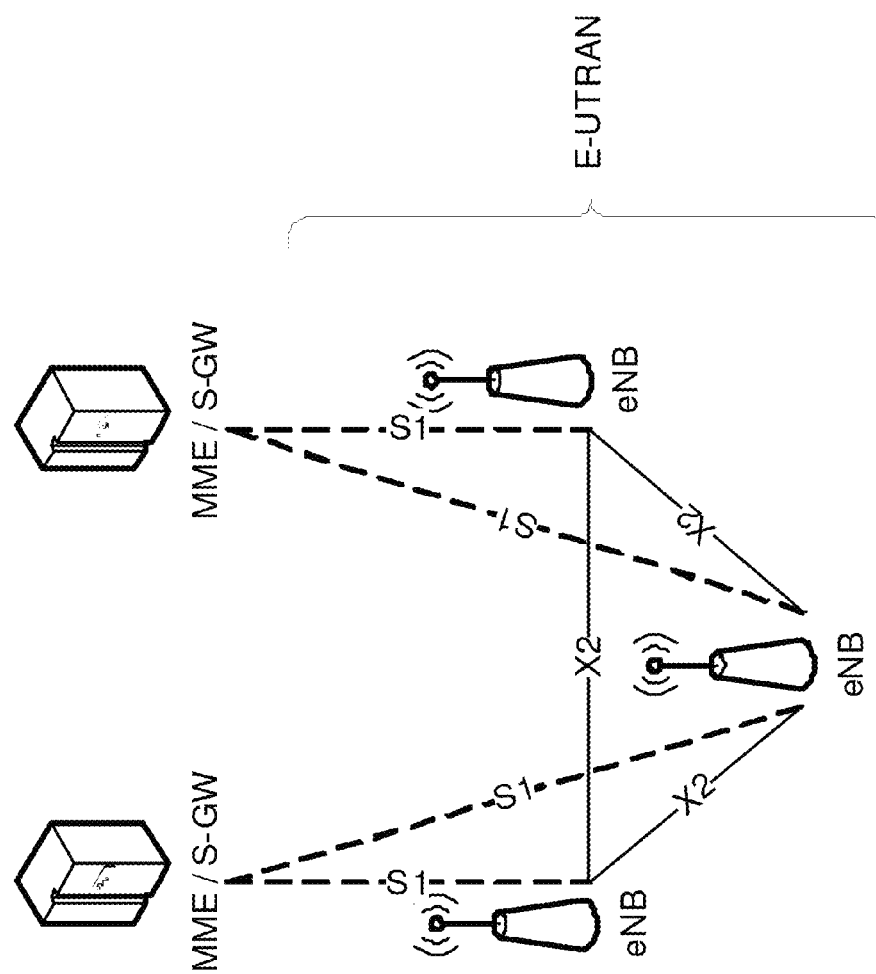
FIG. 1 is a schematic overview depicting a telecommunication network.
Figure 2:
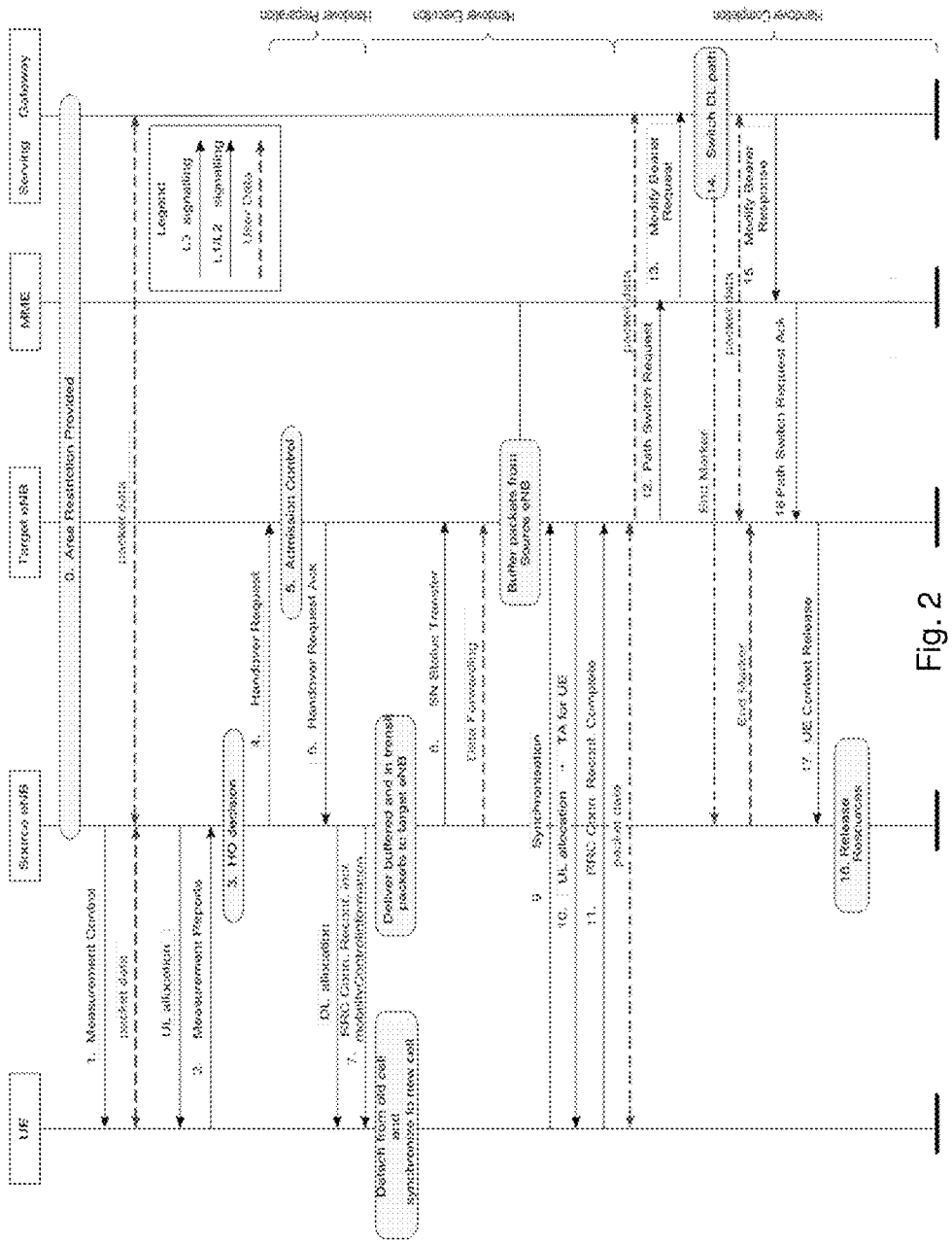
FIG. 2 is an overview of a handover process.
Figure 3:
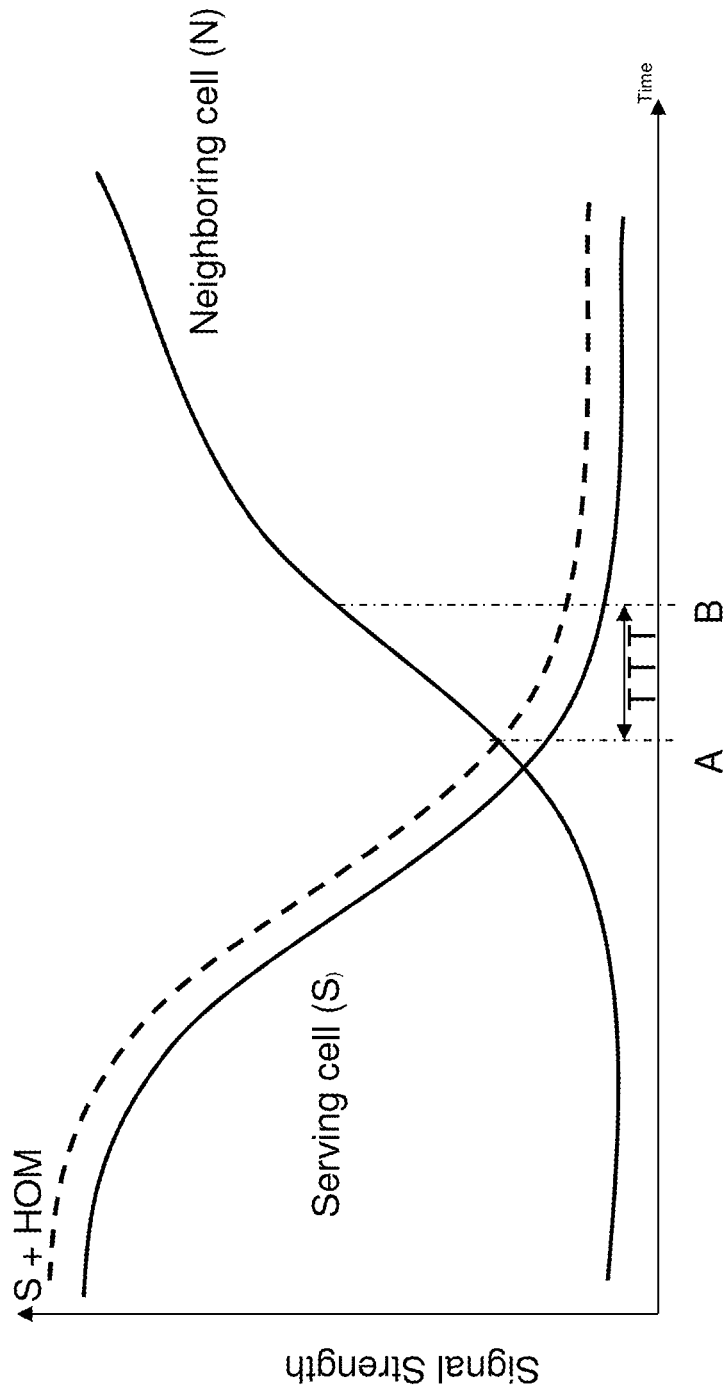
FIG. 3 is a schematic diagram depicting signal strengths during handover.
Figure 4:
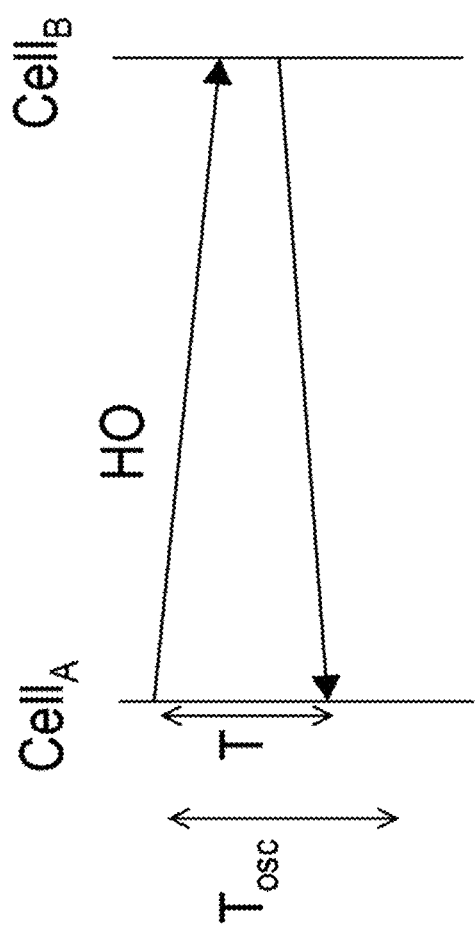
FIG. 4 is a schematic signalling scheme during a handover.
Figure 5:
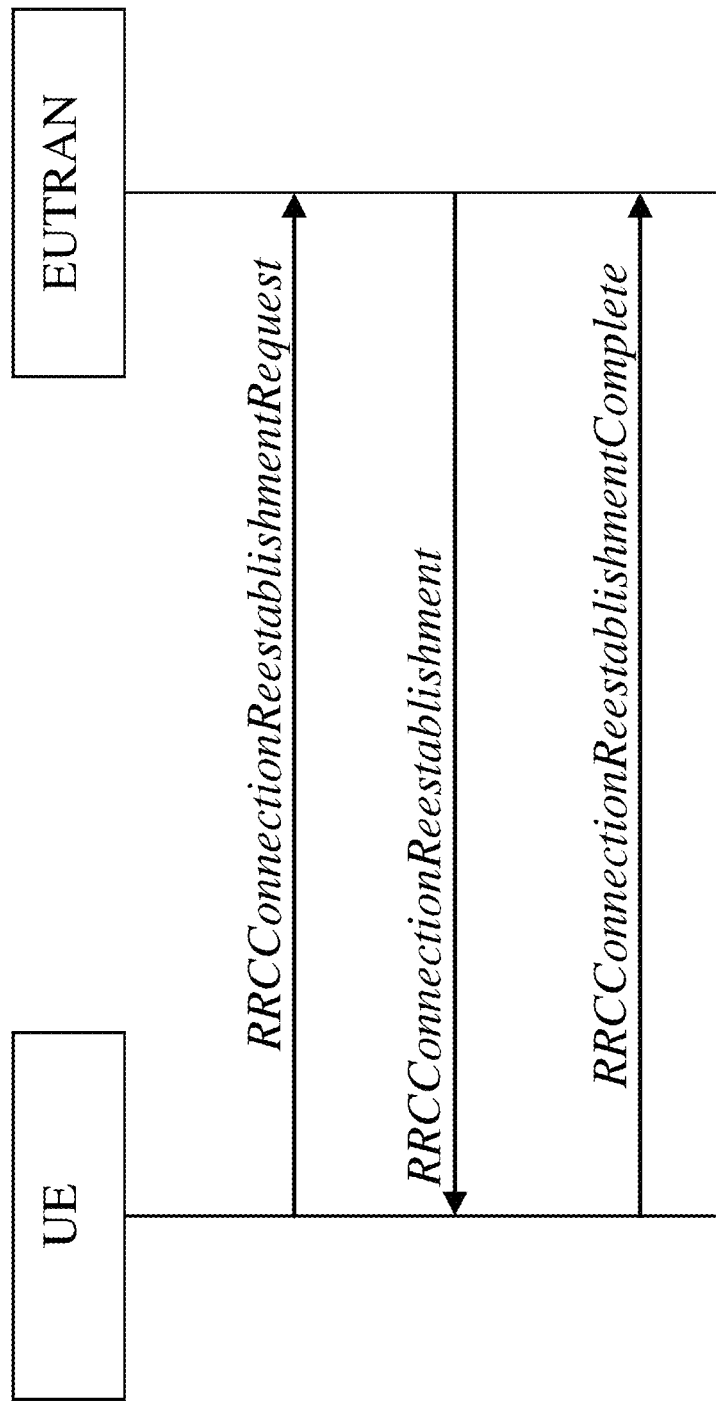
FIG. 5 is a schematic signalling scheme during RRCConnectionReestablishmentRequest.
Figure 6:
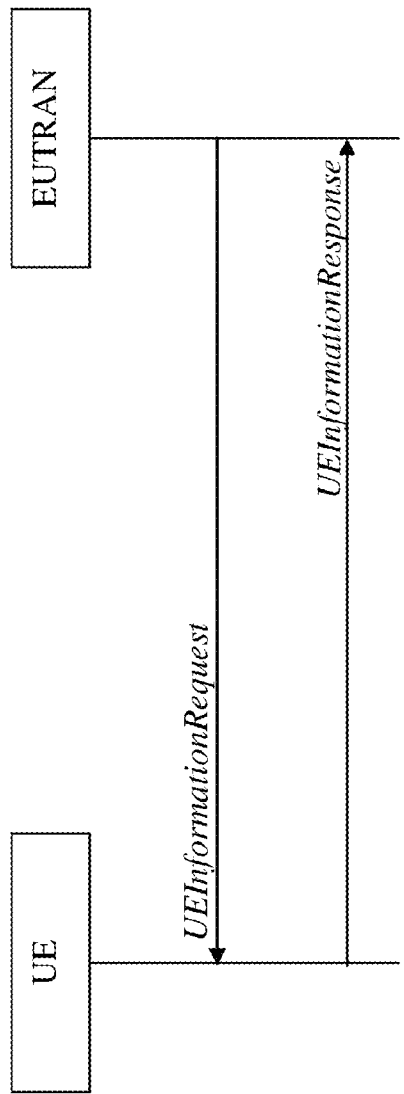
FIG. 6 is a schematic signalling scheme during UEinformation transferring.
Figure 7:
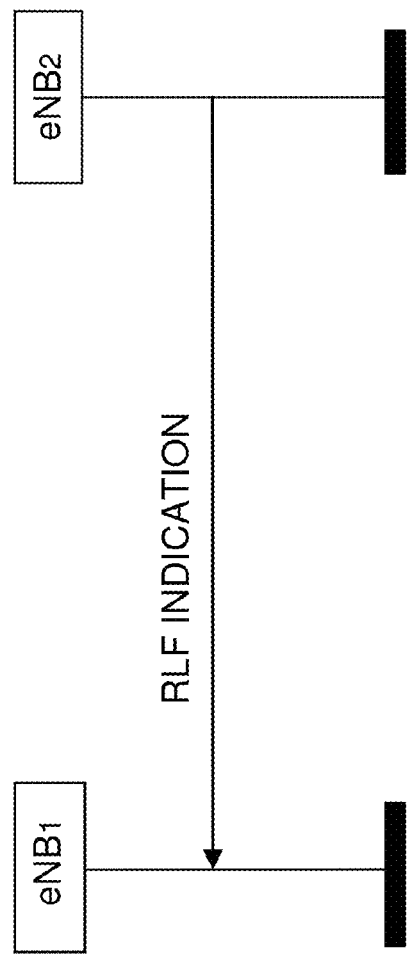
FIG. 7 is a schematic signalling scheme during a RLF.
Figure 8:
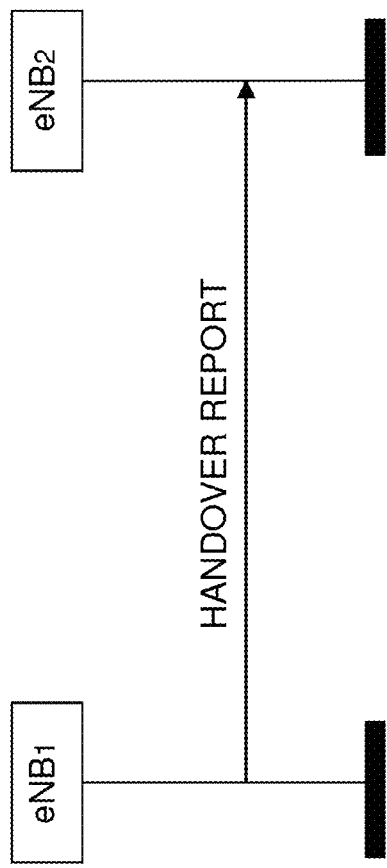
FIG. 8 is a schematic signalling scheme during a handover report transmission.
Figure 9:
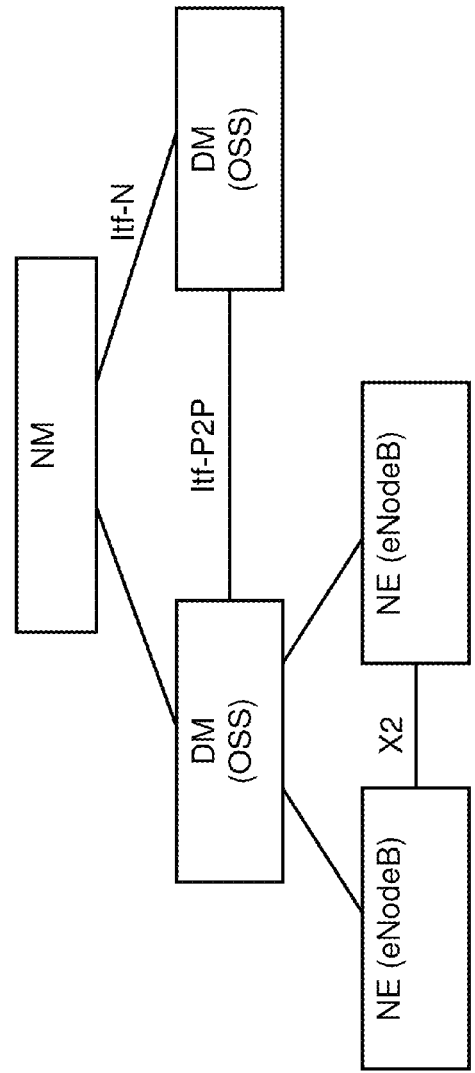
FIG. 9 is a schematic block diagram depicting a management structure in a telecommunication network.
Figure 10:
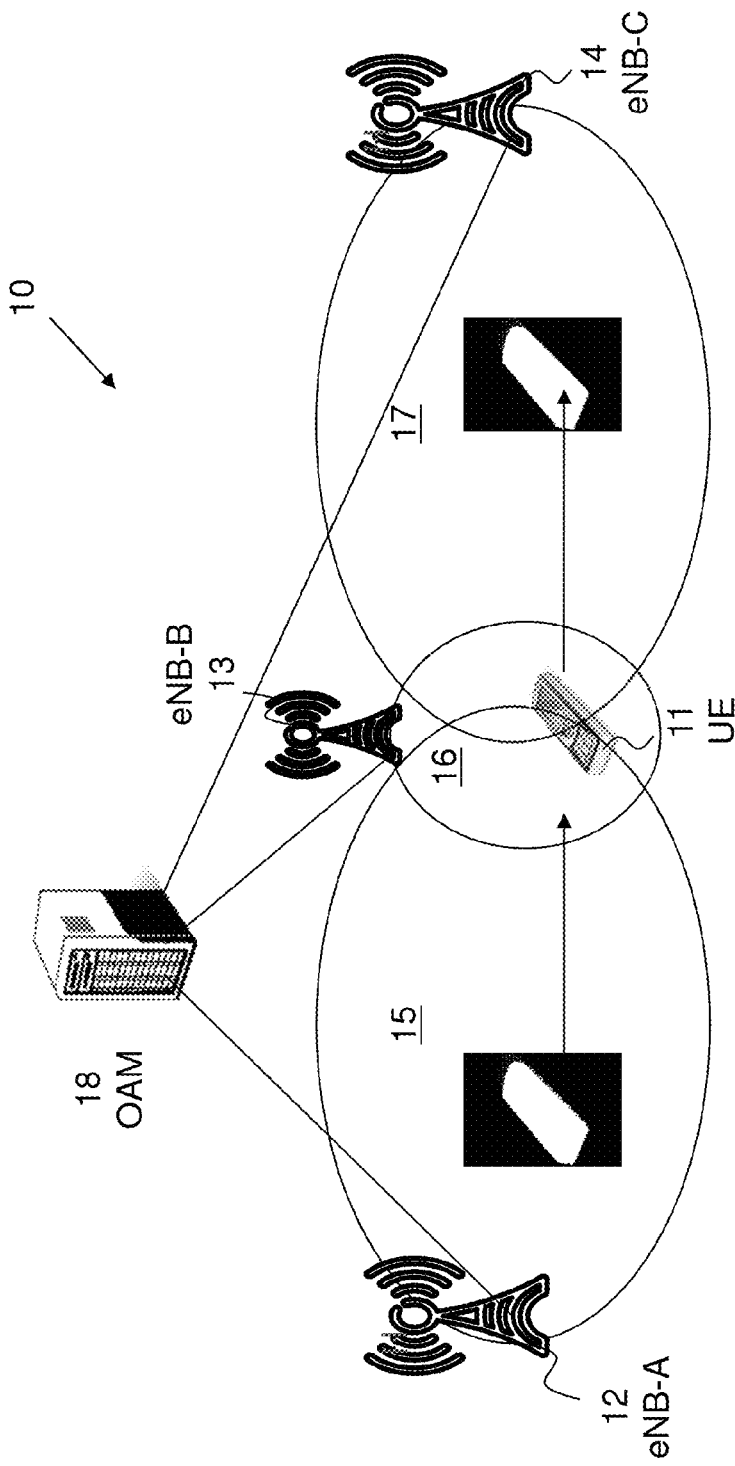
FIG. 10 is a schematic overview depicting a telecommunication network according to embodiments herein.

FIG. 10 is a schematic overview depicting a telecommunication system 10. A Universal Mobile Telecommunication System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) for user equipments. In a forum known as the Third Generation Partnership Project (3GPP), telecommunication suppliers propose and agree upon standards for third generation networks and UTRAN specifically, and investigate enhanced data rate and radio capacity. Specifications for the Evolved Packet System (EPS) have completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the network nodes are directly connected to the EPC core network rather than to radio network controller (RNC) nodes. In general, in E-UTRAN/LTE the functions of a radio network controller (RNC) are distributed between the network nodes, e.g., eNodeBs in LTE, and the core network. As such, the RAN of an EPS system has an essentially "flat" architecture comprising radio base station nodes without reporting to radio network controller (RNC) nodes.

In the telecommunication system, wireless terminals, also known as mobile stations and/or user equipments (UEs), communicate via a Radio Access Network (RAN) to one or more core networks, illustrated as a user equipment 11 in the FIG. 10.

The RAN covers a geographical area which is divided into cell areas, with each cell area being served by a respective network node such as a first radio base station 12, a second radio base station 13, and a third radio base station 14, denoted as eNB-A, eNB-B, and eNB-C. The radio base station may also be referred to as a base station, which in some networks may also be called, for example, a "NodeB" (in UMTS) or "eNodeB" (in LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The network nodes 12,13,14 communicate over the air interface operating on radio frequencies with the user equipment 11 within range of the network nodes 12,13,14. The first radio base station 12 provides cell coverage over a first cell 15, the second radio base station 13 provides cell coverage over a second cell 16, the third radio base station 14 provides cell coverage over a third cell 17. The cells may be of different coverage size such as macro, micro, pico cells.

In some versions of the RAN, several network nodes such as base stations are typically connected, e.g., by landlines or microwave, to a controller node, such as a radio network controller (RNC) or a base station controller (BSC), which supervises and coordinates various activities of the plural network nodes connected thereto. The RNCs are typically connected to one or more core networks.

Embodiments herein address cases of mobility subject to neither RLF nor HOF but are mainly classified as short stay handovers. To resolve such mobility cases, information concerning the cells involved in the short stay handover or mobility is passed backwards to the first source cell. In FIG. 10, an example of such mobility case is provided. In FIG. 10, it would be useful to allow the first radio base station 12 e.g. the eNB-A, to know the cell(s) where the user equipment 11 camped for a "too short" time. Also, it would be useful to let the first radio base station 12 know the speed of such user equipment 11. Thus, in embodiments herein the first radio base station 12 is informed about short stay handover occurrences and also e.g. information about the speed of the user equipment 11 at that time. Short stay handover may also be referred to as a time interval stayed in cell below a threshold time length. The time interval may be measured between 'handover-completion' to 'handover-execution'.

The second radio base station 13, may disclose short stay handover of the user equipment 10 by comparing the time served by the second radio base station 13, e.g. the previous radio base station or the current radio base station, to a time threshold also called permanence threshold.

In an embodiment according to the scenario in FIG. 10, the user equipment's permanence threshold below which a short stay handover is defined may be passed or sent from source, e.g. first radio base station 12, to a target, e.g. second radio base station 13. Such information concerning minimum permanence time could be comprised, for example, in the mobility preparation messages, e.g. in X2: HANDOVER REQUEST.

In a some embodiments, the time threshold such as a UE permanence threshold is configured in each radio base station 12,13,14 by a Operation and Maintenance node (OaM) 18, which is a node that e.g. provide network fault indication, performance information, and data and diagnosis functions.

By communicating information regarding handovers that lead to short stay handover, radio base stations or other network nodes may adjust their HO parameter or parameters effectively, or prioritize handover candidate or candidates. Such HO parameter may comprise time to trigger, cell IDs or similar. For example, from the short stay handover reports a network node may get some information like this: many user equipments, that have reported cell X as their top candidate target and cell Y as one of the next best candidates, end up being handed over to cell Y shortly after being handed over to cell X. From this, the source network node such as the first radio base station 12 may either try to adjust the CIO towards cells Y and X, so that cell Y becomes more favorable than cell X, or it may leave the CIOs as they are and initiates handover to cell Y even though the measurement report was showing that the user equipment 10 has better radio conditions with cell X than Y (assuming Y is also included in the measurement report as one of the candidates).

Another possibility could be to see if there is some correlation with the speed of the user equipments. For example, the first radio base station 12 notices that user equipments with a certain speed suffer from short stay handovers but not others, and based on the speed of the concerned user equipment 10 may decide to reprioritize the candidate targets in the received measurement report. It should here be noted that in a first network node is illustrated in the examples as the first radio base station 12, a second network node is illustrated as the second radio base station 13 and a third network node is illustrated as the third radio base station 14. However, the first network node may in some embodiments be the third radio base station 14 and the second network node may in some embodiments be the third radio base station al 14 depending on where detection is made and transmitted to.

Figure 11:
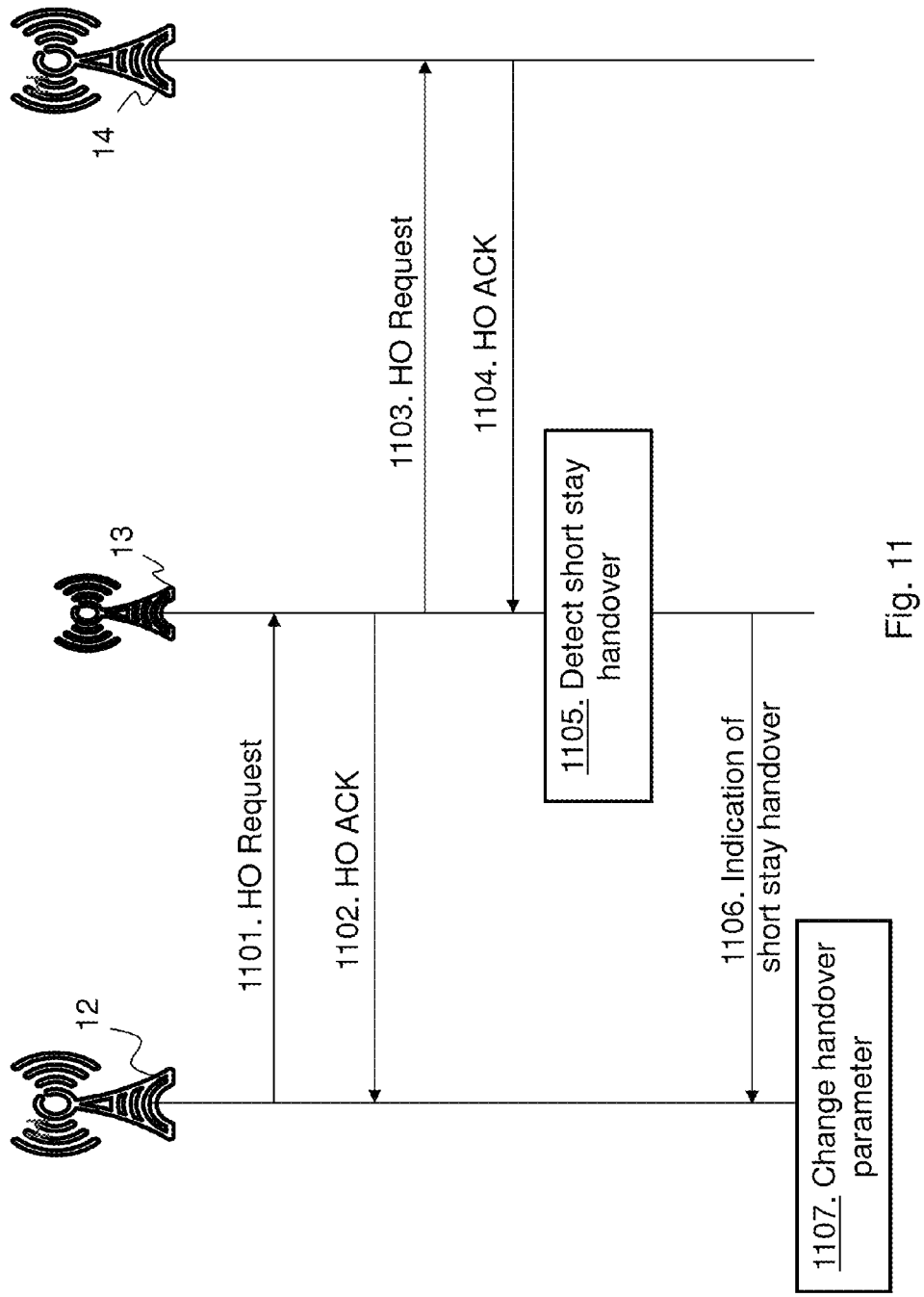
FIG. 11 is a schematic combined flow chart and signalling scheme according to embodiments herein.

FIG. 11 shows a diagrammatic view illustrating an embodiment for detecting short stay handover. The user equipment 11 successfully relocates from first cell 15 to the second cell 16. Shortly after, the user equipment 11 successfully relocates from the second cell 16 to the third cell 17. This is an example of information propagation for avoidance of short stay handovers.

Action 1101. The first radio base station 12 transmits a HO Request over X2 to the second radio base station 13. The HO Request comprises the time threshold e.g. a minimum UE permanence time.

Action 1102. The second radio base station 13 confirms reception by transmitting a HO Acknowledgement (ACK) over X2 to the first radio base station 12.

Action 1103. The second radio base station 13 transmits a HO Request over X2 to the third radio base station 14 since the user equipment 11 is travelling into third cell 17. The HO Request comprises the time threshold e.g. the minimum UE permanence time.

Action 1104. The third radio base station 14 confirms reception by transmitting a HO ACK over X2 to the second radio base station 13.

Action 1105. According to embodiments herein the second radio base station 13 detects a short stay handover as the user equipment 11 is only in the second cell 16 a time interval below the time threshold. The time may be measured from handover completion to the second cell 16 to handover execution to the third cell 17.

Action 1106. The second radio base station 13 transmits, signals or sends an indication of the detected short stay handover to the first radio base station 12. For example, when the second radio base station 13 has disclosed or determined that a short stay handover of the served user equipment 11, the second radio base station 13 may report this back to the first radio base station 12 with a message comprising information e.g.

PCI and/or E-CGI of final target node, such as the third radio base station 14, and/or UE speed at a time of handover to the third cell 17 or after completed handover from the first cell 15, or while being served by the second radio base station 13, within the second cell 16.

Optionally, the Cell Type IE of the third cell 17 and of the second cell 16, which according to relevant standard comprises an indication of the cell size The information above allows the first radio base station 12 to identify the third cell 17 and to eventually promote future handovers to the third cell 17 rather than to the second cell 16. Such decisions may also be based on UE speed information, i.e. information about the speed of the user equipment 11.

The indication or information above may be sent from the second radio base station 13 to the first radio base station 12 via a HANDOVER REPORT message, which will be used for a new purpose, i.e. detection of short stay handovers and in addition to short stay handovers that are not associated to handover failures. This may be encoded by introducing a new handover cause e.g. short stay or similar to the HANDOVER REPORT.

In some embodiments, the use of a UE history Information or Information Element (IE) in a message, which UE history information is modified. When the second radio base station 13 detects a short stay handover, it generates a modified UE history information that may e.g. comprise: a) an additional entry corresponding to the third cell 17, which is a target cell, where the user equipment 11 is going to be handed over to; b) the speed of the user equipment 11 at the time of handover to third cell 17 or before; and the second radio base station 13 sends this UE history information by a new message or via an existing message such as X2: Handover Report from the second cell 16 to the previous source cell, i.e. the first radio base station 12. The message X2: HO REPORT may comprise: HO Report Type=short stay; PCI-C; ECGI-C; Cell Type (third cell 17); UE Speed.

In some embodiments (not shown), the handover report informing about the short stay handover is sent from the third radio base station 14 serving the third cell 17 to the first radio base station 12 serving the first cell 15 if the stay in the second cell 16 is considered short. This may be identified by the third radio base station 14 by consulting the UE history information received at the third radio base station 14 from the second radio base station 13, where the last entry shows the duration stay in the second cell 16. This assumes that the third radio base station 14 has acquired the UE minimum permanence threshold from UE context or OaM, or based on an indication of a short say handover from the second radio base station 13 serving the second cell 16. For example, the UE minimum permanence threshold determining short stay handovers may be exchanged via X2 Setup signalling, X2: eNB Configuration Update signalling or even via S1: eNB/MME Configuration Transfer.

Action 1107. The first radio base station 12 may then change handover parameter or parameters based on the received indication. For example, the first radio base station 12 may set-up a direct handover to the third cell 17 instead of the second cell 16.

Moreover, in any of the embodiments, the first cell 15, or the third cell 17 *c* alternatively or additionally, may add the third cell 17, first cell 15, as neighbour and possibly establish X2 as a consequence of the handover report, implementation aspect. This procedure may be based on the Self Organising Network (SON) information transfer via MME to retrieve the connectivity information.

Even though LTE is the considered in the example, similar information could be conveyed via or processed by an RNC or BSC.

In FIG. 11, the handover report signalling from the third radio base station 14 serving the third cell 17 to the first radio base station 12 serving the first cell 15 may be conditioned to whether X2 is available between the first radio base station 12 and the third radio base station 14.

In some alternative embodiments the second radio base station 13 or the third radio base station 14 may transmit UE history IE indicating time of stay, cell ID and similar. The first radio base station 12 may then based on this information determine whether a short stay handover has occurred.

Figure 12:
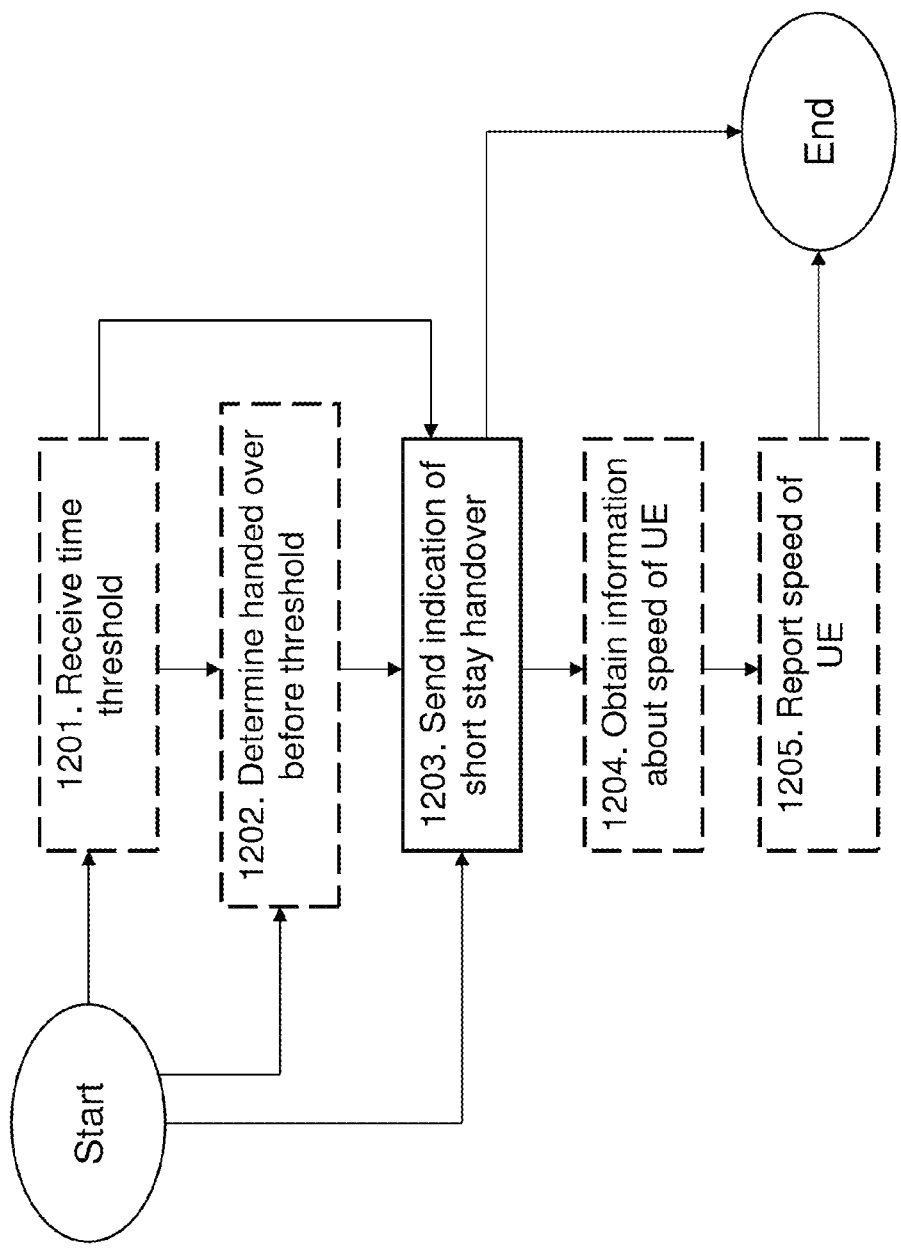
FIG. 12 is a schematic flow chart depicting embodiments herein.

The method actions in the second network node, exemplified above as the second radio base station 13 or the third radio base station 14, for detecting a short stay handover of the user equipment 11 in the second cell 16 in the telecommunication system 10 according to some general embodiments will now be described with reference to a flowchart depicted in FIG. 12. The actions do not have to be taken in the order stated below, but may be taken in any suitable order. Actions performed in some embodiments are marked with dashed boxes. The user equipment 11 is handed over from the first cell to the second cell 16 and from the second cell 16 to the third cell 17 in the telecommunication system 10. The second network node 13,14 may serve the second cell 16 or the third cell 17.

Action 1201. The second network node 13,14 may receive the time threshold from the first network node 12,18 or another network node.

Action 1202. The second network node 13,14 may determine that the user equipment 11 is handed over to the third cell 17 before the time threshold. Thus, the second network node may measure time from handover completion to the second cell 16 to handover execution to the third cell 17.

Action 1203. The second network node 13,14 sends to the first network node 12,18 an indication in a message that a short stay handover has occurred. This is performed when the second network node 13,14 has determined that the user equipment 11 is handed over to the third cell 17 before the time threshold. The first network node 12,18 is thereby enabled to detect the short stay handover. The first network node 12,18 may be a radio base station 12 or an operation and maintenance node 18. The indication may further indicate that the short stay handover is not associated with a handover failure or a radio link failure.

The message may further comprise an identity of the third cell 17, a cell size, and/or a speed of the user equipment 11. The message may be a handover report and/or a message comprising user equipment history information.

Action 1204. The second network node 13,14 may obtain information about the speed of the user equipment 11. This may be taken into account when adjusting handover parameter or handover candidate in the first network node 12,18.

Action 1205. The second network node 13,14 may further report the speed of the user equipment 11 to the first network node 12.

Figure 13:
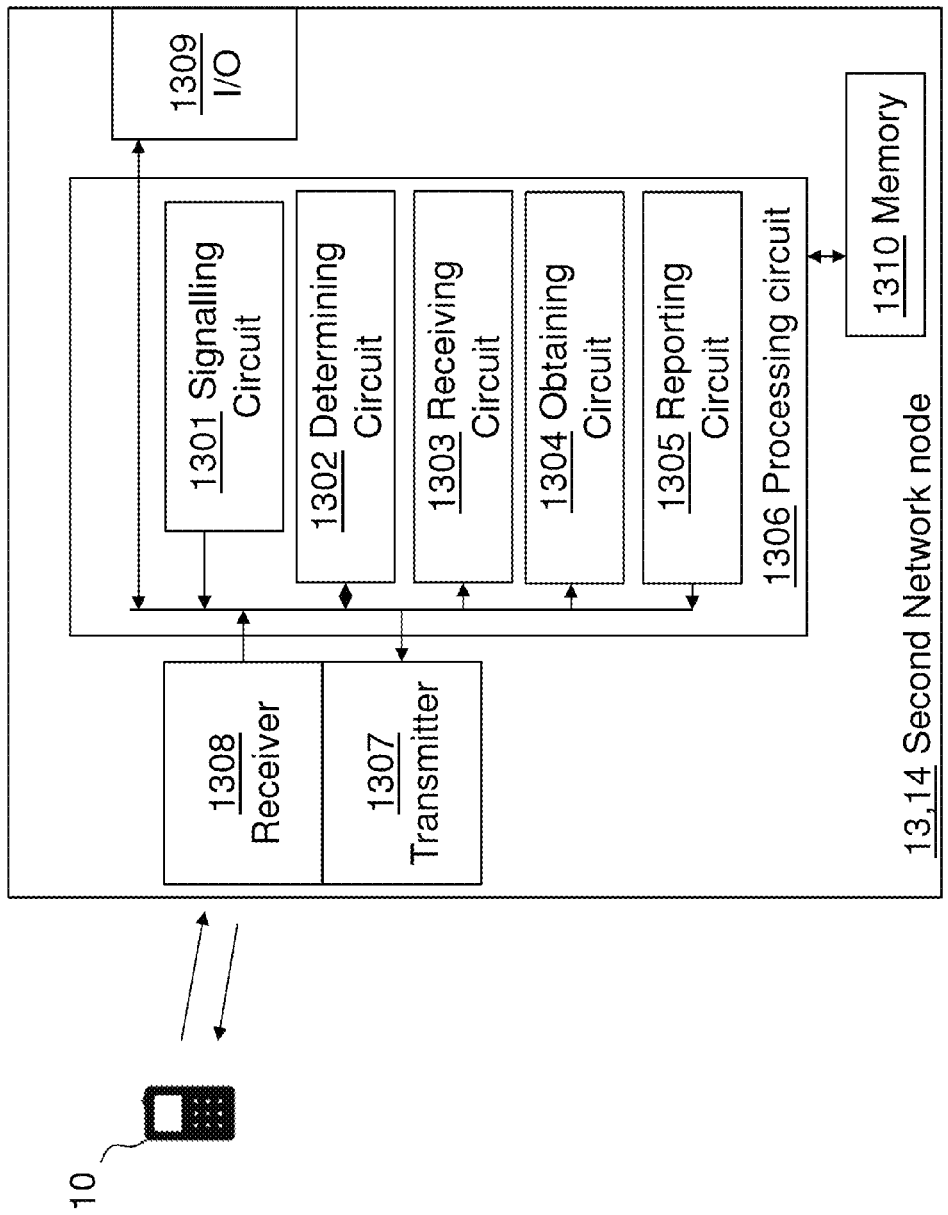
FIG. 13 is a block diagram depicting a second network node according to embodiments herein.

FIG. 13 is a block diagram depicting the second network node, exemplified above as the second radio base station 13 or the third radio base station 14 according to embodiments herein for detecting the short stay handover of the user equipment 11 in the second cell 16 in the telecommunication system 10. The user equipment 11 is handed over from the first cell 15 to the second cell 16 and from the second cell 16 to the third cell 17 in the telecommunication system 10. The second network node 13,14 may be configured to serve the second cell 16 or the third cell 17.

The second network node 13,14 comprises a signalling circuit 1301 configured to send, to the first network node. As mentioned above the first network node may be the first radio base station 12 or the OAM 18, an indication in a message that a short stay handover has occurred. This indicates that the user equipment 11 is handed over to the third cell before the time threshold. The signalling circuit 1301 is thereby configured to enable the first network node 12,18 to detect the short stay handover. The indication may further indicate that the short stay handover is not associated with a handover failure or a radio link failure.

In some embodiments the second network node comprises a determining circuit 1302 configured to determine that the user equipment 11 is handed over to the third cell 17 before the time threshold.

In some embodiments the second network node comprises a receiving circuit 1303 configured to receive the time threshold from the first network node 12,18 or another network node. The time threshold may also be manually configured or configured during manufacturing. In some embodiments the message may further comprise an identity of the third cell 17, a cell size of the third cell 17 and or the second cell 16, and/or a speed of the user equipment 11.

The message may be a handover report and/or a message comprising user equipment history information.

The second network node 13,14 may further comprise an obtaining circuit 1304 configured to obtain information about the speed of the user equipment 11. The second network node 13,14 may also comprise a reporting circuit 1305 configured to report the speed of the user equipment 11 to the first network node e.g. the first radio base station 12 or the OAM 18.

FIG. 13 illustrates an example of a network node, e.g. eNB. As seen, the network node may comprise several devices including a determining circuit 1302, signalling circuit 1301. The second network node is structured to communicate with other network nodes such as the user equipment 11 and to core network nodes. The determining circuit 1302 is configured to determine that a short stay handover occurred and the signalling circuit 1301 is configured to send information indication a result of the determination circuit 1302. FIG. 13 also provides a logical view of the network node and the devices included therein. It is not strictly necessary that each device be implemented as physically separate modules or circuits. Some or all devices may be combined in a physical module. Also, one or more devices may be implemented in multiple physical modules as illustrated in FIG. 13.

As seen in FIG. 13, the devices of the second network node need not be implemented strictly in hardware. It is envisioned that any of the devices maybe implemented through a combination of hardware and software. For example, the second network node may include one or more central processing units 1306 executing program instructions stored in a non-transitory storage medium or in firmware (e.g., ROM, RAM, Flash) to perform the functions of the devices. The second network node, in case of radio base stations, also includes a transceiver structured to receive wireless signals from the user equipment 11 or terminal and to send signals to the user equipment 11 over one or more antennas. A transmitter 1307 and a receiver 1308 may be implemented as physically separate devices. The second network node may also include a network interface 1309 to communicate with other network nodes such as core network nodes or other network nodes e.g. the first radio base station 12 and third radio base station 14.

The second network node may further comprise a memory 1310, which may comprise one or more memory units and may be used to store for example data such as indications, handover parameters, candidates, time thresholds, measured times of being served, application to perform the methods herein when being executed on first network node or similar.

Figure 14:
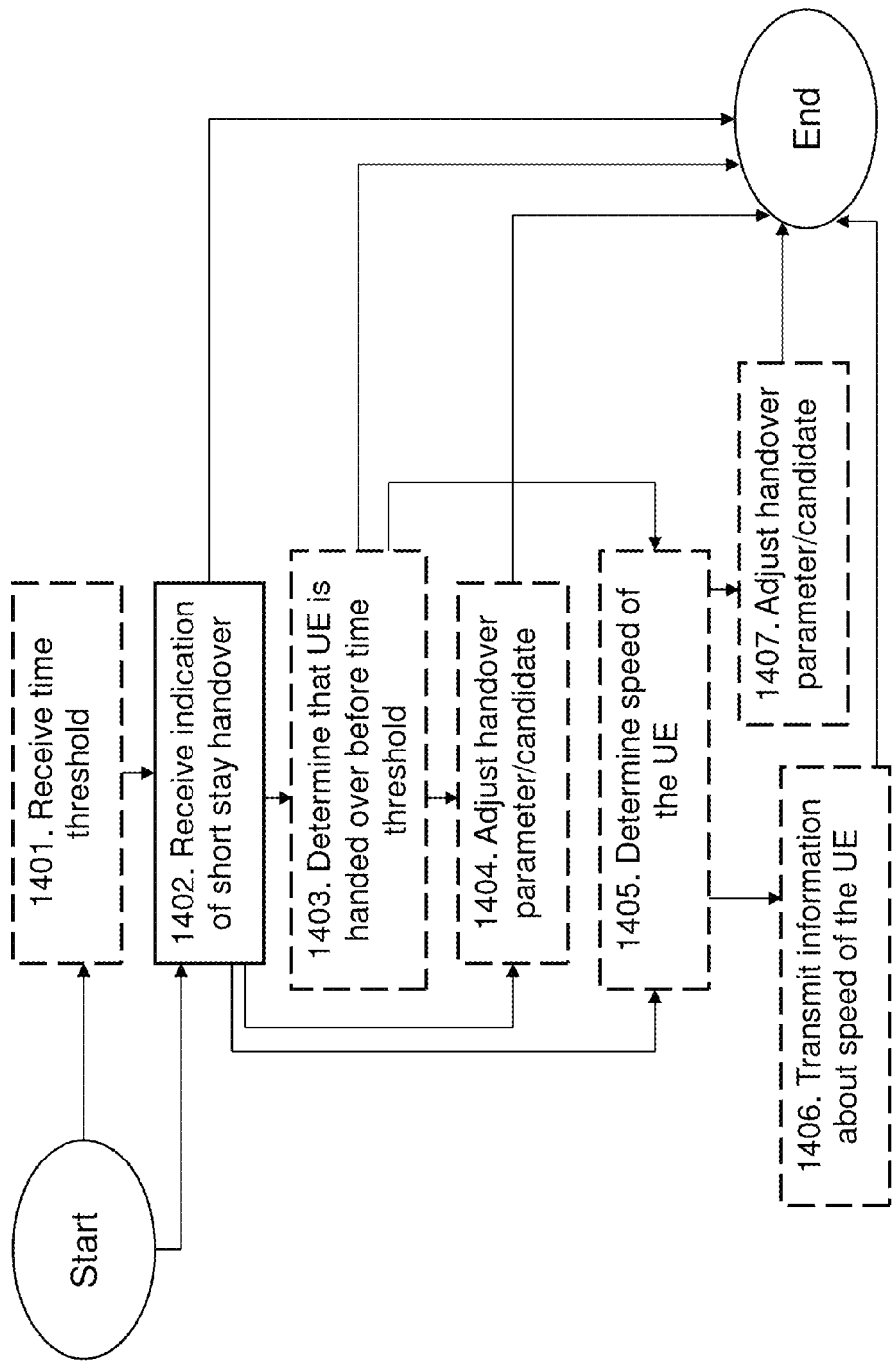
FIG. 14 is a schematic flow chart depicting embodiments herein.

The method actions in the first network node, exemplified as the first radio base station 12 or the third radio base station 14 above, for detecting a short stay handover of the user equipment 11 in the second cell 16 in the telecommunication system 10 according to some general embodiments will now be described with reference to a flowchart depicted in FIG. 14. The actions do not have to be taken in the order stated below, but may be taken in any suitable order. Actions performed in some embodiments are marked with dashed boxes. As stated above the user equipment 11 is handed over from the first cell 15 to the second cell 16 and from the second cell 16 to the third cell 17 in the telecommunication system 10.

Action 1401. The first network node 12,14 may receive the time threshold from an operation and maintenance node 18 or another network node. The time threshold may be a permanence time value such as a UE minimum permanence time. The indication may be comprised in a message being a handover report and/or a message comprising user equipment history information. The message may further comprise an identity of the third cell 17, a cell size, and/or a speed of the user equipment 11. The indication may further indicate that the short stay handover is not associated with a handover failure or a radio link failure Action 1402. The first network node 12,14 receives from the second network node 13,14, the indication that a short stay handover has occurred indicating that the user equipment 11 is handed over to the third cell 17 before the time threshold. Thereby the first network node 12, 18 detects the short stay handover. The first network node may serve the first cell 15 or the third cell 17.

Action 1403. The first network node 12,14 may determine that the user equipment 11 is handed over to the third cell 17 before the time threshold based on time information in the received indication and in that case that a short stay handover has occurred. Action 1404. The first network node 12,14 adjusts handover parameter or handover candidate based on the received indication.

Action 1405. The first network node 12,14 may determine the speed of the user equipment 11. The first network node 12,14 may receive, from the second network node 13, information about the speed of the user equipment 11.

Action 1406. The first network node may, when the first network node 14 serves the third cell 17 being the third radio base station 14, transmit information about the speed to the second network node 13.

Action 1407. When the first network node serves the first cell 15 being the first radio base station 12, the first network node 12 may adjust handover parameter or handover candidate based on the received indication and the determined speed.

Figure 15:
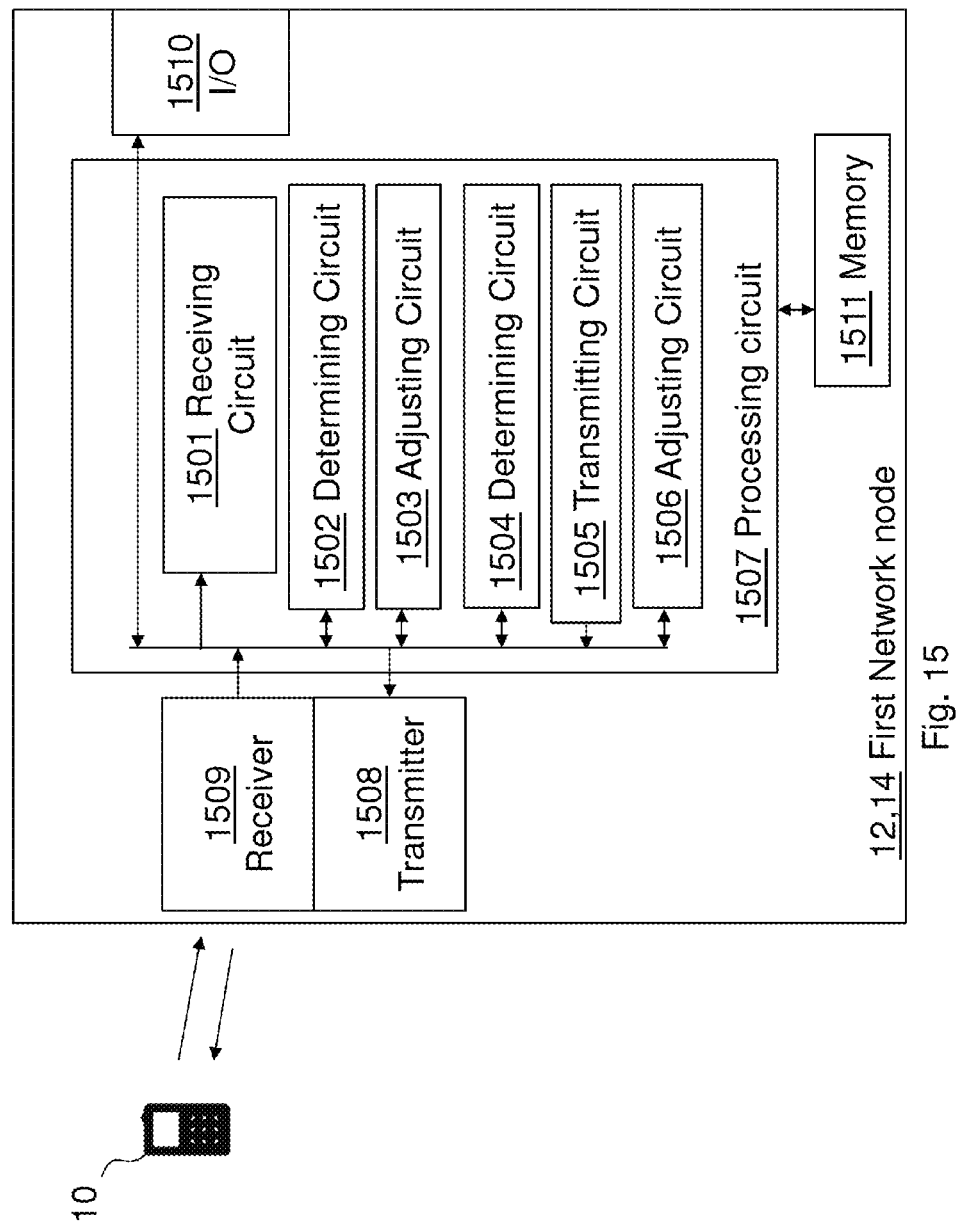
FIG. 15 is a block diagram depicting a first network node according to embodiments herein.

FIG. 15 is a block diagram depicting the first network node, exemplified above as the first radio base station 12 or the third radio base station 14, according to embodiments herein for detecting the short stay handover of the user equipment 11 in the second cell 16 in the telecommunication system 10. The user equipment 11 is handed over from the first cell 15 to the second cell 16 and from the second cell 16 to the third cell 17 in the telecommunication system 10. The first network node is configured to serve the first cell 15 or the third cell 17.

The first network node comprises a receiving circuit 1501 configured to receive from a second network node, such as the second radio base station 13 or the third radio base station 14, an indication that the short stay handover has occurred indicating that the user equipment 11 is handed over to the third cell 17 before a time threshold. The receiving circuit 1301 is thereby configured to detect the short stay handover. The indication may be comprised in a message being a handover report and/or a message comprising user equipment history information. The message may further comprise an identity of the third cell 17, a cell size, and/or a speed of the user equipment 11. The indication may further indicate that the short stay handover is not associated with a handover failure or a radio link failure.

In some embodiments the first network node further comprises a determining circuit 1502 configured to determine that the user equipment 11 is handed over to the third cell 17 before the time threshold based on time information in the received indication. In that case the determining circuit 1502 is configured to determine that a short stay handover has occurred.

In some embodiments the first network node further comprises an adjusting circuit 1503 configured to adjust handover parameter or handover candidate based on the received indication.

In some embodiments the first network node further comprises a determining circuit 1504 configured to determine a speed of the user equipment 11. The first network node may then further comprise a transmitting circuit 1505 configured to transmit, when the first network node 14 serves the third cell 17, information about the speed to the second network node 13. Alternatively or additionally may the first network node comprise an adjusting circuit 1506 configured to adjust, when the first network node 12 serves the first cell 15, handover parameter or handover candidate based on the received indication and the determined speed. The determining circuit 1504 may be configured to receive, from the second network node, such as the second radio base station 13, information about the speed of the user equipment 11.

In some embodiments the receiving circuit 1501 may be configured to receive the time threshold from an operation and maintenance node 18 or another network node, which time threshold may be a permanence time value.

As seen in FIG. 15, the devices of the first network node need not be implemented strictly in hardware. It is envisioned that any of the devices maybe implemented through a combination of hardware and software. For example, the first network node may include one or more central processing units 1507 executing program instructions stored in a non-transitory storage medium or in firmware (e.g., ROM, RAM, Flash) to perform the functions of the devices. The first network node, in case of radio base stations, also includes a transceiver structured to receive wireless signals from the user equipment 11 or terminal and to send signals to the user equipment 11 over one or more antennas. A transmitter 1508 and a receiver 1509 may be implemented as physically separate devices. The second network node may also include a network interface 1510 to communicate with other network nodes such as core network nodes or other network nodes e.g. the first radio base station 12 and third radio base station 14.

The first network node may further comprise a memory 1511, which may comprise one or more memory units and may be used to store for example data such as indications, handover parameters, candidates, time thresholds, measured times, application to perform the methods herein when being executed on first network node or similar.

Thus; in accordance with an aspect of the technology herein, the object is achieved by a method and apparatus for detecting a short stay handover, e.g. Ping Pong handover/handover oscillation.

In accordance with an aspect of the technology herein, the object is achieved by a method and apparatus for detecting a short stay handover and signalling information to a source eNB indicating that a short stay handover occurred.

In accordance with an aspect of the technology herein, the object is achieved by a method and apparatus for detecting a short stay handover and signalling information to a source eNB indicating that a short stay handover occurred without radio link failure.

In accordance with an aspect of the technology herein, the object is achieved by a method in a network node for detecting a short stay handover. The method comprises determining short stay of a UE and signalling to another network node information indicating a result of determination.

In accordance with an aspect of the technology herein, the object is achieved by a a network node adapted to detect a short stay handover. The network node comprises a determining circuit configured to determine that a short stay of a UE occurred and a signalling circuit adapted to signal to another network node information indicating a result of determination.

In the description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the disclosure and are included within its spirit and scope. In some instances, detailed descriptions of well-known devices, circuits, and methods are omitted so as not to obscure the description of the present disclosure with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein may represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

It should be noted that the technology disclosed herein may be applied to other types of networks and standards, e.g., GSM and UTRAN. E-UTRAN is used merely as an exemplifying standard to illustrate the main concept.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a first base station in a telecommunication system, wherein the method comprises:
    sending a time threshold to a second base station in the telecommunication system, for use by the second base station in detecting short stay handovers from a first cell associated with the first base station to a second cell associated with the second base station;
    handing over a user equipment from the first cell to the second cell;
    receiving a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
    adjusting a handover parameter or a handover candidate in dependence on the message; and
    wherein the method further comprises determining a speed of the user equipment; and
    transmitting, when the first base station serves the third cell, information about the speed to the second base station or adjusting, when the first base station serves the first cell, the handover parameter or handover candidate further based on the determined speed.

2. The method of claim 1, wherein the determining of the speed comprises receiving information about the speed of the user equipment from the second base station.

3. A method in a first base station in a telecommunication system, wherein the method comprises:
    receiving a time threshold from an operation and maintenance node or another network node, which time threshold is a permanence time value;
    sending the time threshold to a second base station in the telecommunication system, for use by the second base station in detecting short stay handovers from a first cell associated with the first base station to a second cell associated with the second base station;
    handing over a user equipment from the first cell to the second cell;
    receiving a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
    adjusting a handover parameter or a handover candidate in dependence on the message.

4. A method in a first base station in a telecommunication system, wherein the method comprises:
sending a time threshold to a second base station in the telecommunication system, for use by the second base station in detecting short stay handovers from a first cell associated with the first base station to a second cell associated with the second base station;
handing over a user equipment from the first cell to the second cell;
receiving a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
adjusting a handover parameter or a handover candidate in dependence on the message;
wherein the message further indicates a cell size of the second cell, and wherein adjusting the handover parameter or handover candidate in dependence on the message comprises adjusting the handover parameter or handover candidate in dependence on the indicated cell size of the second cell.

5. The method of claim 4, wherein the message further indicates that the short stay handover is not associated with a handover failure or a radio link failure.

6. A first base station for use in a telecommunication system, wherein the first base station comprises:
a network interface configured to communicate with one or more other base stations in the telecommunication system; and
a processing circuit associated with the network interface and configured to:
send a time threshold to a second base station in the telecommunication system, for use by the second base station in detecting short stay handovers from a first cell associated with the first base station to a second cell associated with the second base station;
hand over a user equipment from the first cell to the second cell;
receive a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
adjust a handover parameter or a handover candidate in dependence on the message; and
wherein the processing circuit is further configured to: determine a speed of the user equipment; and
transmit, when the first base station serves the third cell, information about the speed to the second base station, or adjust, when the first base station serves the first cell, the handover parameter or handover candidate further based on the determined speed.

7. The first station of claim 6, wherein the processing circuit is configured to determine the speed based on information received, from the second base station about the speed of the user equipment.

8. A first base station for use in a telecommunication system, wherein the first base station comprises:
a network interface configured to communicate with one or more other base stations in the telecommunication system; and
a processing circuit associated with the network interface and configured to:
send a time threshold to a second base station in the telecommunication system, for use by the second base station in detecting short stay handovers from a first cell associated with the first base station to a second cell associated with the second base station;
hand over a user equipment from the first cell to the second cell;
receive a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
adjust a handover parameter or a handover candidate in dependence on the message; and
wherein the processing circuit is further configured to receive the time threshold from an operation and maintenance node or another network node, which time threshold is a permanence time value.

9. A first base station for use in a telecommunication system, wherein the first base station comprises:
a network interface configured to communicate with one or more other base stations in the telecommunication system; and
a processing circuit associated with the network interface and configured to:
send a time threshold to a second base station in the telecommunication system, for use by the second base station in detecting short stay handovers from a first cell associated with the first base station to a second cell associated with the second base station;
hand over a user equipment from the first cell to the second cell;
receive a message from the second base station indicating that the user equipment experienced a short stay handover in the second cell, in which a time interval between the handover of the user equipment from the first cell to the second cell and a subsequent handover of the user equipment from the second cell to a third cell in the telecommunication system, was less than the time threshold; and
adjust a handover parameter or a handover candidate in dependence on the message; and
wherein the message further indicates a cell size of the second cell and wherein the processing circuit is configured to adjust the handover parameter or handover candidate in dependence on the indicated cell size.

10. The first base station of claim 9, wherein the message further indicates that the short stay handover is not associated with a handover failure or a radio link failure.

11. The method of claim 3, further comprising sending the time threshold to the second base station in a handover message sent to the second base station for the handover of the user equipment from the first cell to the second cell.

12. The first base station of claim 8, wherein the processing circuit is configured to send the time threshold to the second base station in a handover message sent to the second base station for the handover of the user equipment from the first cell to the second cell.

* * * * *